July 30, 1968  F. H. SCHNEEBERG ET AL  3,394,754
METHOD AND APPARATUS FOR CONTROLLING AIR FLOW
Filed Aug. 8, 1966  3 Sheets-Sheet 2
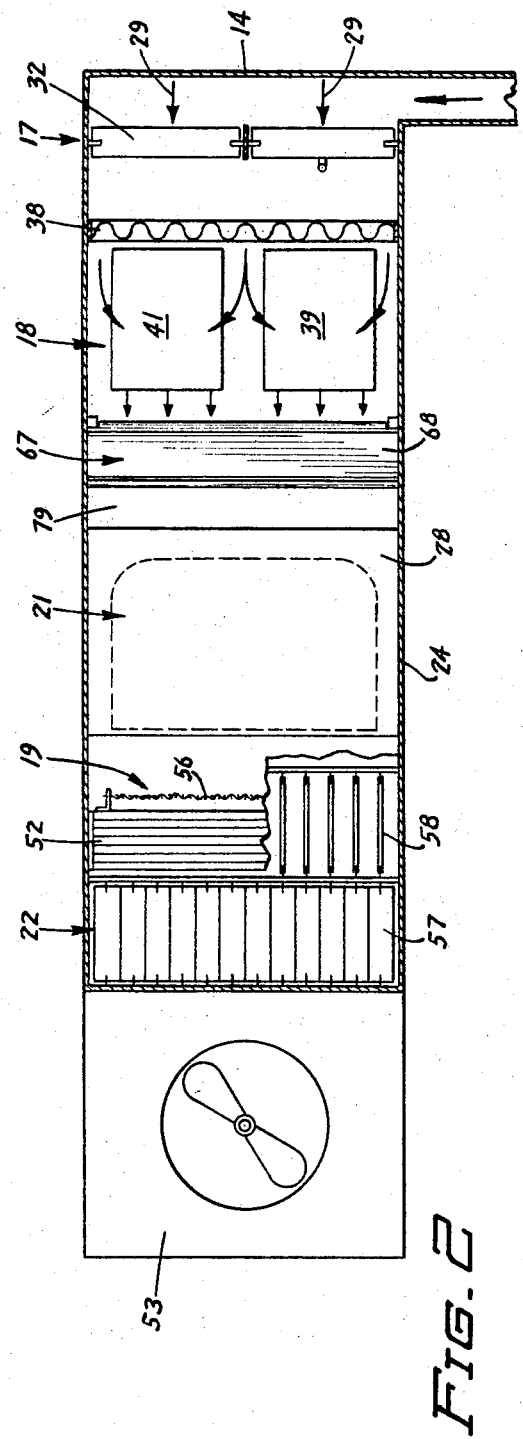
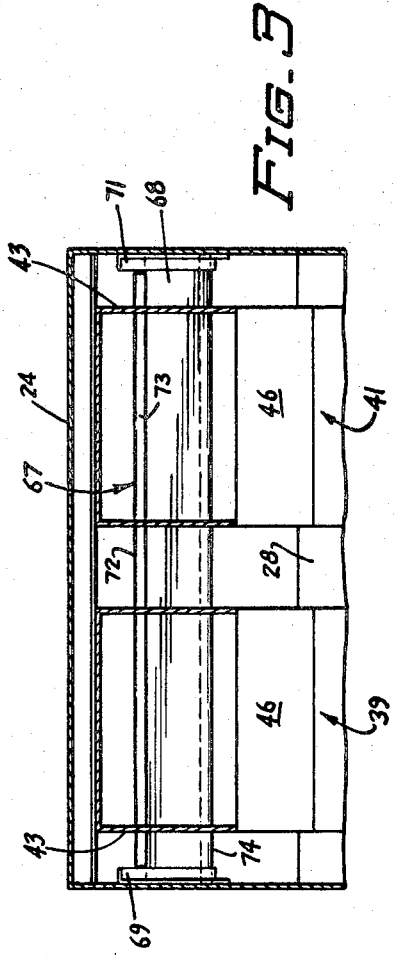
INVENTORS
Floyd H. Schneeberg
Kenneth R. Klucas
Terrance A. Lish
BY
Braddock + Burd
ATTORNEYS

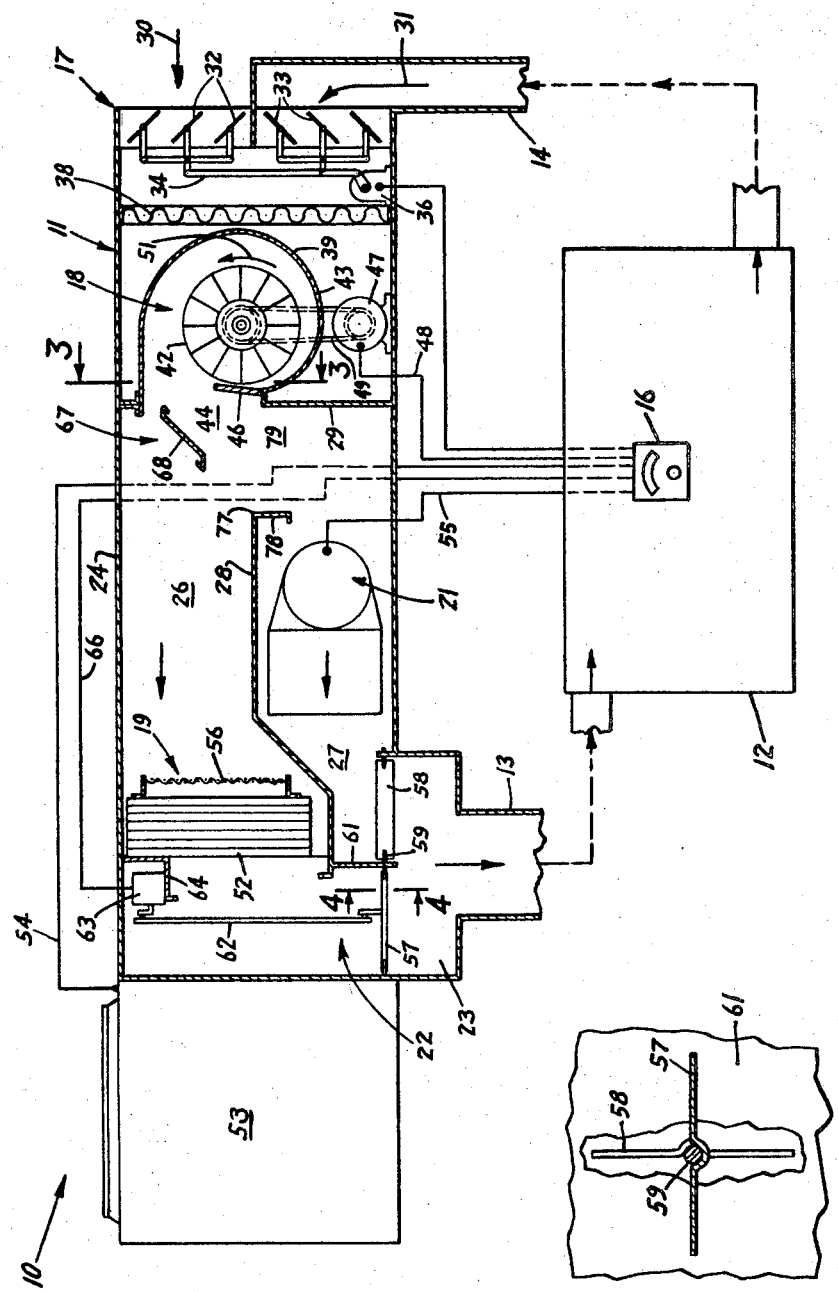

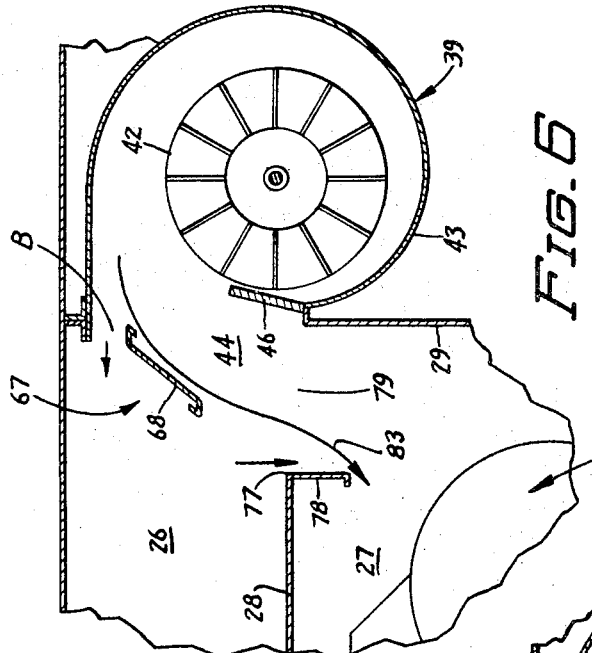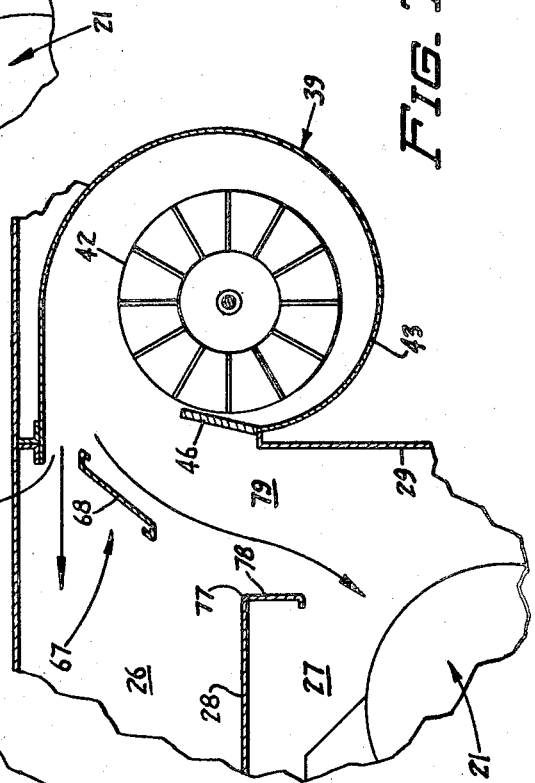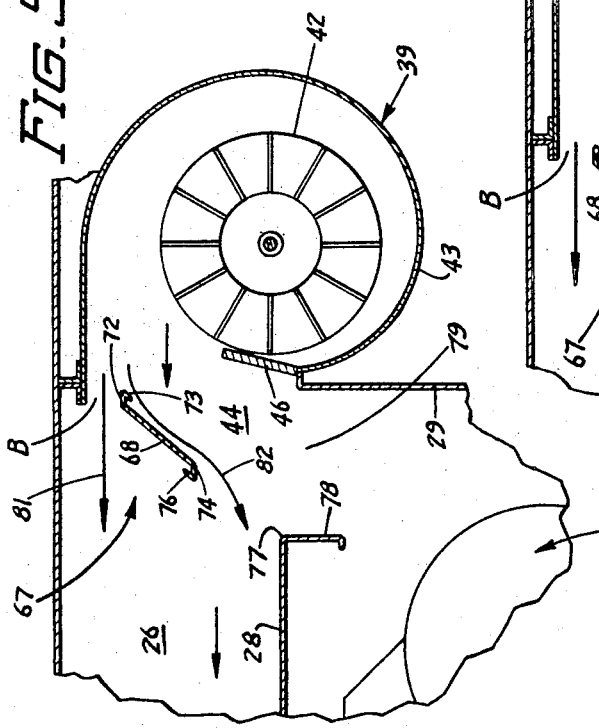

United States Patent Office 3,394,754
Patented July 30, 1968

3,394,754
METHOD AND APPARATUS FOR
CONTROLLING AIR FLOW
Floyd H. Schneeberg, Minnetonka, and Kenneth R.
Klucas and Terrance A. Lish, Minneapolis, Minn.,
assignors to Mammoth Industries, Inc., Minneapolis, Minn., a corporation of Minnesota
Filed Aug. 8, 1966, Ser. No. 570,877
15 Claims. (Cl. 165—1)

ABSTRACT OF THE DISCLOSURE

A heating, ventilating and air conditioning apparatus having a heating unit and an air conditioning unit located in separate passageways supplied with moving air from a blower. An air flow deflector plate located between the blower and the air condition passageway is operable to allow about one third of the discharge volume of the air of the blower to flow into the cooling passage. About one third of the volume of air strikes the deflector and is deflected downwardly into the inlet of the heating passage. Separate dampers are operable to open and close the exhaust opening of the heating passage and the cooling passage. The remaining one third of the air discharged from the blower will be deflected downwardly into the heating passage or flow into the cooling passage depending on the open and closed positions of the dampers.

This invention relates to an improved method and apparatus for controlling the flow of air through two separate passages. More particularly the invention is directed to controlling the flow of air through a combined heating and cooling apparatus of a ventilating and air temperature control system.

Briefly described, the apparatus for controlling the flow of air is a heating, ventilating and air conditioning apparatus operable to control the temperature and movement of air in a zone, as a room. The apparatus has a housing divided into a first passage and a second passage. A cooling means, as an evaporator coil, located in the first passage and a heat exchange unit located in the second passage either decreases or increases the temperature of air flowing through the respective passages.

The air is forced through the passages by blower means located adjacent the entrance openings of the passages. The volume of air moving in each passage is controlled by exhaust control dampers located at the exit openings of the passages in combination with air deflector means located between the blower means and the entrance openings of the passages. The deflector means is positioned relative to the air stream discharged by the blower means to allow about one-third of the volume of air to flow into the first passage and deflect about one-third of the air toward the entrance of the second passage. The shape and position of the deflector means prevents recirculation of air in each of the passages when the dampers at the end of one passage is closed. This permits the use of short passages thereby increasing operating efficiency and reducing the overall length and weight of the apparatus.

The air is discharged from either the first or second passage or both passages depending on the positions of the exhaust control dampers into a mixing chamber. A duct system connects the mixing chamber with the zone which is to receive the air. Additional mixing chambers associated with separate exhaust control dampers supply air to other zones.

In the drawing:
FIGURE 1 is a diagrammatic view of a forced air heating and cooling system having the heating, ventilating and air conditioning apparatus of the invention;

FIGURE 2 is a plan view of the heating, ventilating and air conditioning apparatus of FIGURE 1;
FIGURE 3 is an enlarged sectional view taken along the line 3—3 of FIGURE 1;
FIGURE 4 is an enlarged sectional view taken along the line 4—4 of FIGURE 1;
FIGURE 5 is an enlarged framentary sectional view of FIGURE 1 showing the air flow around the diverter plate for the cooling cycle;
FIGURE 6 is a view similar to FIGURE 5 showing the air flow around the diverter plate for the heating cycle; and
FIGURE 7 is a view similar to FIGURE 6 showing the air flow around the diverter plate into both heating and cooling passages.

Referring to the drawings there is shown in FIGURE 1 a ventilating and air temperature control system indicated generally at 10 having the heating, ventilating and air conditioning apparatus 11 of this invention. Apparatus 11 is functionally connected to a zone 12, as a room or area in a building to supply the zone with air having controlled temperature. The zone is connected to the exhaust and intake openings of apparatus 11 by a supply duct 13 and a return duct 14. A controller 16 within zone 12 senses the temperature of the air in the zone and controls the operation of apparatus 11 in response to temperature changes.

Apparatus 11 has an intake control 17 operable to regulate the amount and ratio of return air and outside fresh air drawn into apparatus 11. A blower means indicated generally at 18 is used to draw air through the intake openings and discharge air to a throat area co-extensive with a cooling passage and a heating passage. An air cooling unit 19 is located in the cooling passage and a heat exchange unit 21 is located in the heating passage. On the downstream side of air conditioning unit 19 and heat exchange unit 21 is an exhaust control 22 operable to regulate the flow of both hot and cold air and ratio of hot and cold air into a mixing chamber 23 open to the exhaust openings and coupled to supply duct 13. Exhaust control 22 is operable to either close or open either the heating or the cooling passages whereby the air flowing through apparatus 11 may be selectively hot air or cold air. Exhaust control 22 is also operable to allow both hot and cold, including fresh, air to flow through the apparatus into mixing chamber 23.

Apparatus 11 has an elongated housing or casing 24 divided into an upper cooling passage 26 and a lower heating passage 27 by a horizontal insulated dividing wall 28. An upright transverse wall 29 separates blower means 18 from the heating and cooling passages 26 and 27. The forward transverse edge 77 of wall 28 is spaced from wall 29 to provide an entrance opening 79 for passage 27.

Intake control 17 functions to regulate the supply of fresh air 30 and return air 31 which is drawn into the apparatus by blower means 18. Intake control 17 comprises a plurality of horizontally disposed intake dampers or valves 32 and 33 which divide the upper and lower half of the intake opening of housing 24 into a fresh air intake and a return air intake. Valves 32 and 33 are normally disposed to each other and interconnected by a linkage 34 which operates to simultaneously move the valves to opposite operating positions. For example, when valve 32 is open, valve 33 is closed. A motor 36 connected to linkage 34 operates to change the positions of valves 32 and 33 to regulate the ratio of fresh air and return air. A line 37 electrically couples motor 36 with controller 16. Interposed between the valves 32 and 33 and the blower means 18 is a replaceable filter 38.

Blower means 18, as shown in FIGURE 2, comprises a pair of axially aligned side-by-side pumps or blower units 39 and 41 operable to draw air through both fresh air and return air intakes and through filter 38. Units 39 and 41 are identical in construction. As shown in FIGURE 1, each unit has an axial impeller 42 having a plurality of circumferentially spaced impeller blades or vanes located within a scroll type housing 43. The housing has a rectangular discharge opening facing a throat area 44 open to the cooling passage 26 and heating passage 27. Secured to the upper end of upright wall 29 is a baffle plate 46 determining the bottom edge of the air discharge opening of unit 39. A motor 47 electrically coupled by line 28 to controller 16 is connected through a power transmitting means, as a belt, link chain or the like, to impeller 42. The impeller is rotated by motor 47 in the direction of arrow 51 to discharge air into the throat area 44. A second motor may be used to rotate the impeller of the second blower unit 41 to provide greater control of the amount of air moved through the passages 26 and 27. Motor 47 can be used to rotate both impellers.

The air cooling unit 19 is located above a downwardly stepped portion of the intermediate dividing wall 28 in cooling passage 26. Air cooling unit 19 comprises an upright rectangular shaped evaporator coil 52 which is coupled to a condenser 53 to form a refrigeration cycle, the details of which do not form any part of this invention. A line 54 electrically couples the controls of unit 19 with zone controllers 16. Located adjacent the upstream side of evaporator coil 52 is a screen 56 which functions to provide resistance to the flow of air. Screen 56 may be removed if necessary to balance the resistance to the flow of air through the cooling passage 26 with the resistance to the flow of air through heating passage 27. The heat exchange unit 21 and the evaporator coil 52 with screen 56 have substantially equal air flow resistance.

Heat exchange unit 21 located in the heating passage 27 below the intermediate dividing wall 28 may be of any type of heater and can vary in size and design. Unit 21 may have a burner modulated motor (not shown) electrically coupled by line 55 to controllers 16. The modulating motor is operable to change the operating characteristics of the burner to a high and low fire position.

Exhaust control 22 operates to regulate the amount of air which flows through both the cooling passage 26 and heating passage 27. Control 22 includes a plurality of side-by-side dampers or gates 57 mounted across the exhaust opening of cooling passage 26 and a plurality of side-by-side dampers or gates 58 mounted across the exhaust opening of heating passage 27.

As shown in FIGURE 4, each of the adjacent dampers 57 and 58 are disposed normally relative to each other and are interconnected with an axial rod 59 whereby the adjacent dampers rotate together. FIGURE 1 shows rod 59 projected through upright wall 61 separating the cooling passage 26 from heating passage 27. A single pair of dampers 57 and 58 or a number of pairs of dampers are connected to a rod and crank arm linkage 62 moved by a reversible electrical motor 63 mounted on a bracket 64 positioned in the upper part of cooling passage 26 behind coil 52. A line 66 connects motor 63 with zone controller 16. Mixing chamber 23 may be divided into a plurality of chambers each connected to a separate supply duct for a separate zone whereby the apparatus may control the flow of and temperature of the air in multiple zones. In multiple zone installations separate reversible motors 63 are used to control the positions of the pairs of dampers 57 and 58 for each of the zones.

As shown in FIGURES 1 and 2, dampers 57 are closed blocking cooling passage 26 while dampers 58 are in an upright open position permitting maximum flow of air through the heating passage 27. Motor 63 may be operated to partially open each of the dampers thereby allowing air to flow in both cooling passage 26 and heating passage 27 into the common mixing chamber 23.

This mixed or blended air moves through supply duct 13 into zone 12.

Extended across throat area 44 above and forwardly of the leading edge 77 of the intermediate wall 28 is an air flow deflector indicated generally at 67 operable to allow about one-third of the discharged volume of air from blower means 18 to flow above the deflector into cooling passage 26. About one-third of the volume of air strikes the deflector and is deflected in a downward direction toward the inlet opening 79 of the heating passage 27. The remaining volume of air will flow under the deflector into the cooling passage 26 or downwardly into entrance opening 79 depending on the open and closed positions of dampers 57 and 58. Deflector 67 is designed and inclined to minimize turbulence in the flow of air into the passages 26 and 27 thereby save power and provide for maximum air distribution over evaporator coil 52 and heat exchange unit 21.

As shown in FIGURES 3 and 5, deflector 67 is a downwardly and rearwardly projected plate 68 which extends transversely across the throat area 44. Plate 68 is located across the middle sections of the discharge openings of the blower units 39 and 41 to allow air to flow over and under the plate into cooling passage 26. The opposite ends of plate 68 are secured to upwardly inclined supports 69 and 71 mounted on the side walls of housing 24.

To reduce turbulence and provide for laminar flow of air past plate 68 the upper edge of plate 68 has a forward horizontal extension 72 terminating in a downwardly and rearwardly inclined lip 73. The lower edge of plate 68 has a rearward horizontal extension 74 terminating in an upwardly and forwardly projected lip 76 enabling the plate to be installed in an inverted position without destroying the desired laminar flow characteristics. The discharge areas of the blower units 39 and 41 are correlated with the distance B between the top of plate 68 and the top wall of the scroll 43 defining the top of the blower unit discharge openings so that approximately one-third of the volume of air discharged by the rotating impellers 42 flows over the top of plate 68 while the remaining volume of the air either strikes the inclined plate 68 or flows under the inclined plate into the cooling passage 26. This distance varies with the discharge capacity of the impeller.

The inclined forward face of plate 68 is positioned in an inclined plane which projects downwardly and rearwardly through the forward edge 77 of the intermediate wall 28 and the upper edge of the discharge end of scroll 43. The angle of the plate 68 with respect to wall 28 varies with the size and dimensional relationships between the cooling passage 26 and the heating passage 27. For example, in one particular installation plate 68 is inclined at an angle of 50° with respect to the horizontal surface of wall 28. A downwardly projected transverse plate 78 secured to the leading edge 77 of intermediate wall 28 defines the rear side of entrance opening 79 into heating passage 27. Plate 78 is located in an upright plane which is behind rear edge of deflector plate 68.

As shown in FIGURE 5, with heating discharge dampers 58 closed, the air discharged by the rotating impellers 42 moves into the cooling passage 26 around deflector plate 68. Approximately one-third of the volume of air discharged by the rotating impellers moves over the plate 68 as indicated by arrow 81. About one-third of the air strikes plate 68 and is deflected downwardly as indicated by arrow 82. With dampers 58 closed the static pressure of the air in heating passage 27 increases above the air pressure in cooling passage 26. This difference in air pressure establishes an air lock or door across the entrance opening 79. The air indicated by arrow 81 moving over plate 68 establishes a suction or vacuum pressure behind the plate which draws air indicated by arrow 82 into the cooling passage 26. Thus, the deflector 67 prevents recirculation of air through the heating passage and back to the cooling passage thereby substantially reducing the cooling load as only air moved by the blower units 39 and 41 is forced through the cooling passage 26.

As shown in FIGURE 6, cooling dampers 57 are closed and the heating dampers 58 are open. Blower units 39 and 41 discharge air indicated by arrow 83 against the inclined deflector plate 68. This air is drawn downwardly through entrance opening 79 into heating passage 27. The pressure of air in cooling passage 26 prevents air from flowing through the cooling passage since this pressure is greater than the pressure of air moving through the heating passage 27. As the air moves past the opening below plate 68 into entrance opening 79 there is created a venturi effect which draws some of the air behind plate 68 which passed over the plate downwardly through entrance opening 79. This prevents recirculation of air through the cooling passage before the air flows downwardly into the heating passage 27. This eliminates the heating of air which has been cooled by coil 52.

As shown in FIGURE 7, air can concurrently flow from the blower unit over deflector plate 68 into the cooling passage 26 and downwardly through the entrance opening 79 into heating passage 27. This divided flow of air will occur when both cooling damper 57 and heater damper 58 are partially open allowing the air to flow through both passages 26 and 27 respectively. The total amount of air flowing through apparatus 11 is substantially constant. The zones regardless of the positions of dampers 57 and 58 also maintain a constant air volume. Changes in the open and closed positions of dampers 57 and 58 vary the relative ratio of air flowing in the passages and do not change the total amount of air discharged into mixing chamber 23.

Controller 16 located in zone 12 may include separate control means one of which includes an on-off switch, a season selector "Summer-Mild-Winter" switch and an outside manual potentiometer switch. The selector switch operates to set apparatus 11 for automatic operation according to the heating and cooling season. When the season selector switch is set for either "Winter" or "Mild" season a mixed air temperature control in the controller circuit automatically adjusts air intake dampers 32 and 33 to maintain a fixed return air temperature. In cooling, the mixed air control is out of the circuit and any volume from zero to one hundred percent of outside air can be used. When the season selector switch is on "Winter" the heating circuit is operative. Movement of this switch to the "Summer" position activates only the cooling circuit. When the season selector switch is set on "Mild" both heating and cooling units are operative. This permits cooling of various zones of a building while heating other zones of the same building. Blended air can still be delivered to additional zones. The potentiometer switch is used to operate motor 36 to change the positions of the air intake dampers 32 and 33 thereby regulating the amounts of fresh air and return air drawn into apparatus 11.

In operation, as shown in FIGURE 1, inlet dampers 32 and 33 are positioned to allow a mixture of outside air 30 and return air 31 to flow into blower means 18. Operation of motor 36 will adjust the ratio of outside air 30 to inside air 31. The impellers 42 on operation of motor 47 will move the air through the impeller scrolls 43 and discharge the air as continuous streams into throat area 44.

Deflector 67 extends transversely across throat area 44 in the path of the streams of air discharged by blower means 18. The size and shape of the deflector plate 68 is correlated with the size of the discharge openings of the blower means as well as the air discharge capacity of the blower means such that approximately one-third of the volume of air discharged by the blower means passes over the top of deflector plate 68. This one-third volume of air comprises the outer peripheral volume of air discharged by the blower means. Approximately one-third of the middle portion of the air discharged by the blower means 18 strikes the downwardly inclined face of deflector plate 68 and is directed downwardly toward entrance opening 79 of heating passage 27. With the heating discharge dampers 58 open as shown in FIGURE 1, the air flows through heating passage 27, around the heat exchange unit 21 and through the exhaust opening past dampers 58 into mixing chamber 23. Duct 13 carries the air to zone 12 and duct 14 returns the air from zone 12 to the air intake of apparatus 11.

When the cooling dampers 57 are closed, the air does not recirculate in cooling passage 26 back to opening 79. On opening of damper 57 the heating damper 58 will partially close thereby restricting air flow through heating passage 27 while allowing air flow through cooling passage 26. The flow of air in each of the passages 26 and 27 is a ratio of the total amount of air flowing in both passages as dampers 57 and 58 are proportionately opened and closed relative to each other. When damper 58 is closed, damper 57 is open allowing air to flow over and under deflector plate 68 into cooling passage 26. As air moves through evaporator coil 52 the air is cooled and directed by housing 24 to the exhaust openings between dampers 57 into one or more mixing chambers 23.

Controller 16 is operative to control reversible motor 63 thereby control the blending of the hot air and cold air in chamber 23 according to the requirements of the zone. Each zone has a separate control motor similar to motor 63 which is operable to mix both cool and warm air or fresh air in a separate mixing chamber connected by ducts to the zone.

In terms of a method of controlling the flow of air through a cooling passage and a heating passage having substantially equal resistance to the flow of air the invention comprises the steps of directing a stream of air into a throat area 44 co-extensive with the entrance openings of the passages. One or more streams of air can be directed into the throat area. About one-third of the volume of the stream of air is allowed to flow into the cooling passage. At the same time the center one-third portion of the volume of the stream of air is directed toward the entrance opening of the heating passage. The amount of air which flows through each of the heating and cooling passages is proportionately controlled by dampers 57 and 58 which regulate the flow of air from each passage. The air which moves through the exhaust openings past dampers 57 and 58 is mixed or blended in chamber 23. The mixed air is transported in duct 13 to a discharge location as zone 12.

While there have been shown and described the novel features of the invention as applied to a preferred embodiment it may be understood that changes may be made by those skilled in the art without departing from the spirit of the invention. The invention is limited only by the scope of the following claims.

The embodiments of the invention in which an exclusive property or privilege is claimed are defined as follows:

1. An apparatus for controlling the flow of air comprising a housing having a first passage and a second passage, each of said passages having entrance and exhaust openings and a throat area forward of and in communication with both entrance openings, damper means operable to open and to close the exhaust openings of said first and second passages, means for discharging a stream of air into the throat area only toward the entrance opening of the first passage, and deflector means located in the throat area only in front of the entrance opening of the first passage in the stream of air and separated from each entrance opening for directing part of the air discharged into the throat area toward the entrance opening of the second passage.

2. An apparatus for controlling the flow of air comprising a housing having a first passage and a second passage, each of said passages having an entrance opening and an exhaust opening, damper means operable to open and close the exhaust openings of said first and second passages, means for discharging air toward the entrance opening of the first passage, deflector means for directing part of the discharged air toward the entrance opening of the second passage, said air discharge means comprising blower means having an air discharge opening facing the entrance opening of the first passage, said deflector means comprising an inclined plate extended transversely of the midsection of the air discharge opening to deflect said air whereby about one-third of the volume of air discharged by the blower means flows past said plate into the first passage and about one-third of said volume of air flows toward the inlet opening of the second passage.

3. The apparatus of claim 2 including air cooling means located in one of said passages, and heat exchange means located in the other of said passages, said cooling means and heat exchange means having substantially the same air flow resistance.

4. The apparatus of claim 2 including air cooling means located in one of said passages, heat exchange means located in the other of said passages, and air flow impeding means in one of said passages to balance the air flow resistance in the passages.

5. The apparatus of claim 2 wherein the damper means proportionately control the exhaust openings of the first and second passages to maintain a substantially constant air flow exhaust discharge area.

6. An apparatus for controlling the flow of air comprising a housing having a first passage, a second passage, and an intermediate horizontal wall separating the first passage from the second passage, each of said passages having an entrance opening and an exhaust opening, damper means operable to open and close the exhaust openings of the first and second passages, means for discharging air toward the entrance opening of the first passage, and deflector means for directing part of the discharged air toward the entrance opening of the second passage, said deflector means comprising a transverse plate located forwardly of said horizontal wall, said plate inclined rearwardly and downwardly to deflect about one-third of the volume of discharged air downwardly toward the second passage.

7. The apparatus of claim 6 wherein said plate has a top transverse edge comprising a forward horizontal section terminating in a downwardly and rearwardly inclined lip.

8. An apparatus for controlling the flow of air comprising a housing having a first passage, a second passage, an upright wall, and an intermediate horizontal wall separating the first passage from the second passage, said intermediate wall terminating short of said upright wall to provide an inlet opening into the second passage, each of said passages having an entrance opening and an exhaust opening, damper means operable to open and close the exhaust openings of said first and second passages, means for discharging air toward the entrance opening of the first passage, and deflector means for directing part of the discharged air toward the entrance opening of the second passage, said deflector means comprising a transverse plate located forwardly of said horizontal wall in front of a middle transverse section of the inlet opening into the first passage and above the inlet opening into the second passage, said plate inclined rearwardly and downwardly, said air discharge means comprising a blower means having an air discharge opening facing said plate, the top edge of said discharge opening being at a higher elevation than the top edge of said plate whereby about one-third of the volume of air discharged by the blower means flows over said plate into the first passage and about one-third of said volume of air is deflected downwardly toward the inlet opening of the second passage.

9. The apparatus of claim 8 wherein said plate has a top transverse edge comprising a forward horizontal extension terminating in a downwardly and rearwardly inclined lip.

10. The apparatus of claim 1 wherein said deflector means comprises a transverse plate inclined to direct about one-third of the volume of discharged air toward the entrance opening of the second passage.

11. A method of controlling the flow of air in two separate passages having entrance and exit openings comprising the steps of: directing a stream of air into a throat area co-extensive with the entrances of the passages toward only the entrance opening of one passage, allowing about one-third of the total volume of said stream of air to flow through the throat area into said one passage, deflecting about one-third of the total volume of the stream of air in the throat area toward the entrance of the other passage, and proportionately controlling the flow of air from said passages.

12. The method defined in claim 11 including: providing substantially equal resistance to the flow of air in each passage.

13. The method defined in claim 11 including: directing a plurality of streams of air into the throat area.

14. The method of claim 11 including: mixing the air discharged from said passages and transporting the mixed air to a discharge location.

15. The method defined in claim 11 wherein said one-third volume of air flowing into the one passage is the outer peripheral portion of air of said stream of air and said one-third volume of air directed toward the other passage is the middle portion of air of said stream of air.

References Cited
UNITED STATES PATENTS

| | | | |
|---|---|---|---|
| 2,894,728 | 7/1959 | Davis | 165—126 |
| 3,179,338 | 4/1965 | Ostrander | 165—16 |
| 3,193,000 | 7/1965 | Bressoud | 165—16 |

ROBERT A. O'LEARY, *Primary Examiner.*

CHARLES SUKALO, *Assistant Examiner.*